(12) United States Patent
Sato (10) Patent No.: US 9,846,269 B2
(45) Date of Patent: Dec. 19, 2017

(54) VEHICLE LIGHTING UNIT

(71) Applicant: Stanley Electric Co., Ltd., Tokyo (JP)

(72) Inventor: Koji Sato, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 88 days.

(21) Appl. No.: 14/919,933

(22) Filed: Oct. 22, 2015

(65) Prior Publication Data

US 2016/0116662 A1 Apr. 28, 2016

(30) Foreign Application Priority Data

Oct. 24, 2014 (JP) .................... 2014-216972

(51) Int. Cl.
*F21V 8/00* (2006.01)
*F21S 8/10* (2006.01)

(52) U.S. Cl.
CPC ........ *G02B 6/0016* (2013.01); *F21S 48/1154* (2013.01); *F21S 48/1241* (2013.01);
(Continued)

(58) Field of Classification Search
CPC .. G02B 6/0016; G02B 6/0051; G02B 6/0068; G02B 6/0073; G02B 6/0078;
(Continued)

(56) References Cited

U.S. PATENT DOCUMENTS 7,290,908 B2 * 11/2007 Amano ................. F21S 48/215
257/E33.059
7,419,287 B2 * 9/2008 Gasquet ................. F21S 48/215
362/511
(Continued)

FOREIGN PATENT DOCUMENTS

DE 20 2006 000 920 U1 4/2006
DE 10 207 040 113 A1 2/2009
(Continued)

OTHER PUBLICATIONS

The extended European search report for the related European Patent Application No. 15191086.6 dated Apr. 13, 2016.

*Primary Examiner* — Bao Q Truong
(74) *Attorney, Agent, or Firm* — Kenealy Vaidya LLP (57) ABSTRACT

A vehicle lighting unit can achieve line-shaped light emission with reduced luminance unevenness more than the conventional ones. The vehicle lighting unit can include: an LED having an optical axis in an illumination direction as a forward direction; and a light guiding lens having a plate shape and disposed in front of the LED. The light guiding lens can have a light incident face formed at a rear end thereof; a light exiting face formed at a front end thereof and having an elongated face extending along a left-right direction. The light incident face can have a horizontal cross section taken along the left-right direction, the cross section including a center recessed portion configured to receive light rays emitted from the LED around the optical axis thereof to diffuse the light rays toward the light exiting face in the left-right direction, and two convex portions disposed on both sides of the recessed portion, configured to receive light rays emitted from the LED sideward more than those directed to the recessed portion to condense the light rays forward substantially along the front-rear direction. The light incident face can further have a vertical cross section including a convex face for receiving the light rays from the LED to make the light rays parallel to one another substantially along the front-rear direction.

16 Claims, 6 Drawing Sheets

(52) U.S. Cl.
CPC ......... *F21S 48/215* (2013.01); *F21S 48/2243* (2013.01); *F21S 48/2262* (2013.01); *G02B 6/0051* (2013.01); *G02B 6/0068* (2013.01); *G02B 6/0073* (2013.01); *G02B 6/0078* (2013.01)

(58) Field of Classification Search
CPC .. F21S 48/1154; F21S 48/1241; F21S 48/215; F21S 48/2243; F21S 48/2262
See application file for complete search history.

(56) References Cited

U.S. PATENT DOCUMENTS

| | | | |
|---|---|---|---|
| 7,625,102 B2 * | 12/2009 | Koike | .................. F21S 48/1154 359/708 |
| 9,574,734 B2 * | 2/2017 | Sousek | .................. F21S 48/215 |
| 2014/0056019 A1 | 2/2014 | Gunther | |
| 2014/0071703 A1 | 3/2014 | Motomura | |
| 2014/0247616 A1 | 9/2014 | Arrivet et al. | |
| 2015/0241616 A1 * | 8/2015 | Bungenstock | .......... F21S 48/00 362/511 |

FOREIGN PATENT DOCUMENTS

| | | |
|---|---|---|
| DE | 10 2010 044 424 A1 | 3/2012 |
| DE | 10 2011 002 340 A1 | 10/2012 |
| DE | 20 2013 101 509 U1 | 4/2013 |
| JP | 2011-138695 A | 7/2011 |
| JP | 2012-248358 A | 12/2012 |
| JP | 2013-257947 A | 12/2013 |
| JP | 2014-199763 A | 10/2014 |

\* cited by examiner

VEHICLE LIGHTING UNIT

This application claims the priority benefit under 35 U.S.C. §119 of Japanese Patent Application No. 2014-216972 filed on Oct. 24, 2014, which is hereby incorporated in its entirety by reference.

TECHNICAL FIELD

The presently disclosed subject matter relates to vehicle lighting units to be installed on a vehicle body, and in particular, a vehicle lighting unit having an elongated line-shaped (linear or curved) light emitting part.

BACKGROUND ART

Some conventionally known vehicle lighting units to be installed on a vehicle body can include those capable of emitting light rays in an elongated line shape by means of a light guiding bar that has a relatively simple configuration.

However, the use of the light guiding bar may possess difficulty in accurate light distribution control, resulting in reduction of the light utilization efficiency. In addition, since the light incident face of such a light guiding bar in front of which a light source can be disposed is essentially limited to both end faces in the longitudinal direction. This configuration makes it difficult to obtain brighter light with high intensity.

Therefore, when light with high intensity is required, a light guiding lens capable of controlling light distribution with higher accuracy than the light guiding bar is used instead.

In general, such a light guiding lens of a so-called diffusion type can be configured to have a recessed light incident face for receiving light from a light source to diffuse the received light in the lengthwise direction.

Further, another known light guiding lens can have a convex face at the center thereof in front of the light source, and the entering light rays can be made parallel by the convex face. The light guiding lens can further have side faces on both sides of the convex face where the entering light rays can be guided to total reflection faces to be totally reflected forward. Such a total-reflection type light guiding lens is disclosed, for example, Japanese Patent Application Laid-Open No. 2013-257947.

Recent trend of light sources for use in vehicle lighting unit includes the application of a light emitting diode (LED) excellent in environmental performances. LEDs can generally have a directivity in which the light intensity thereof is decreased as the emission angle becomes large, thereby emitting high intensity light designed around its optical axis at its front center.

Under such a circumstance, when such an LED is used in the system including the conventional diffusion type or total-reflection type light guiding lens, the high intensity light rays emitted from an LED around its optical axis cannot be properly controlled. As a result, the portion of a light emission face just in front of the LED may be brighter than the other portion, resulting in luminance unevenness.

SUMMARY

The presently disclosed subject matter was devised in view of these and other problems and features in association with the conventional art. According to an aspect of the presently disclosed subject matter, a vehicle lighting unit can achieve line-shaped light emission with reduced luminance unevenness more than the conventional ones.

According to another aspect of the presently disclosed subject matter, a vehicle lighting unit can include: an LED having an optical axis in an illumination direction thereof as a forward direction; and a light guiding lens having a plate shape and disposed in front of the LED. The light guiding lens can have a light incident face formed at a rear end thereof, and a light exiting face formed at a front end thereof and having an elongated face extending along a plane substantially perpendicular to a front-rear direction. The light incident face can have a cross section taken along a plane along a longitudinal direction of the light exiting face in the front-rear direction, the cross section including a center recessed portion configured to receive light rays emitted from the LED around the optical axis thereof to diffuse the light rays toward the light exiting face in the elongated direction, and two convex portions disposed on both sides of the recessed portion, configured to receive light rays emitted from the LED sideward more than those directed to the recessed portion to condense the light rays forward substantially along the front-rear direction. The light incident face can further have a cross section taken along a plane perpendicular to the longitudinal direction of the light exiting face, the cross section including a convex face configured to receive the light rays from the LED to make the light rays parallel to one another substantially along the front-rear direction.

According to another aspect of the presently disclosed subject matter, the vehicle lighting unit according to the previous aspect can be configured such that the light exiting face can include a plurality of prism cuts formed thereon, the prism cuts configured to make the light rays guided from the light incident face parallel substantially along the front-rear direction.

According to still another aspect of the presently disclosed subject matter, the vehicle lighting unit according to any of the previous aspects can be configured to further include a diffusion lens disposed in front of the light guiding lens, configured to diffuse the light rays exiting from the light guiding lens while allowing the light rays to pass therethrough forward.

According to still another aspect of the presently disclosed subject matter, the vehicle lighting unit according to any of the previous aspects can be configured to include a plurality of the LEDs and a plurality of the light guiding lenses corresponding to the respective LEDs, the light exiting faces of the light guiding lenses being disposed to be continued to each other along the lengthwise direction of the light exiting face.

According to still another aspect of the presently disclosed subject matter, the vehicle lighting unit according to the previous aspect can be configured such that at least one of the plurality of light guiding lenses can be curved in a thickness direction thereof.

When the light rays emitted from the LED are incident on the light incident face to enter the light guiding lens, the light rays incident on the center recessed portion of the light incident face around the optical axis can be diffused by the center recessed portion around the optical axis in the longitudinal direction (left-right direction) of the light exiting face in the cross section taken along the plane substantially along the longitudinal direction of the light exiting face while the light rays incident on the two convex portions disposed on both sides of the center recessed portion can be condensed forward substantially along the front-rear direction. Furthermore, the light rays from the LED when seen in the cross section taken along the plane substantially perpendicular to the longitudinal direction of the light exiting face can be made parallel to one another substantially along the front-rear direction.

Accordingly, the light rays emitted from the LED and having relatively high intensity around the optical axis can be diffused in the longitudinal direction of the light exiting face while the light rays having low intensity directed sideward with respect to the optical axis can be directed to both sides rather than forward of the LED.

Therefore, the vehicle lighting unit can achieve line-shaped light emission with reduced luminance unevenness more than the conventional ones in which portions of the light emission portion just in front of the LED project high intensity of light.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle lighting units of the presently disclosed subject matter with reference to the accompanying drawings in accordance with exemplary embodiments.

Figure 1:
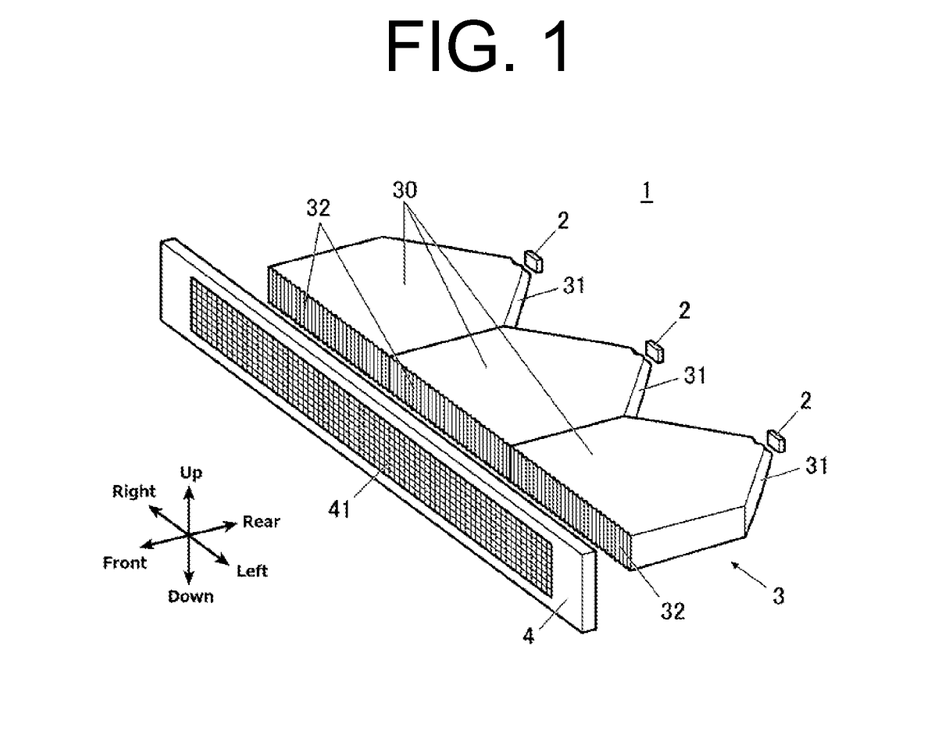
FIG. 1 is a perspective view of essential parts of a vehicle lighting unit made in accordance with principles of the presently disclosed subject matter.
Figure 2:
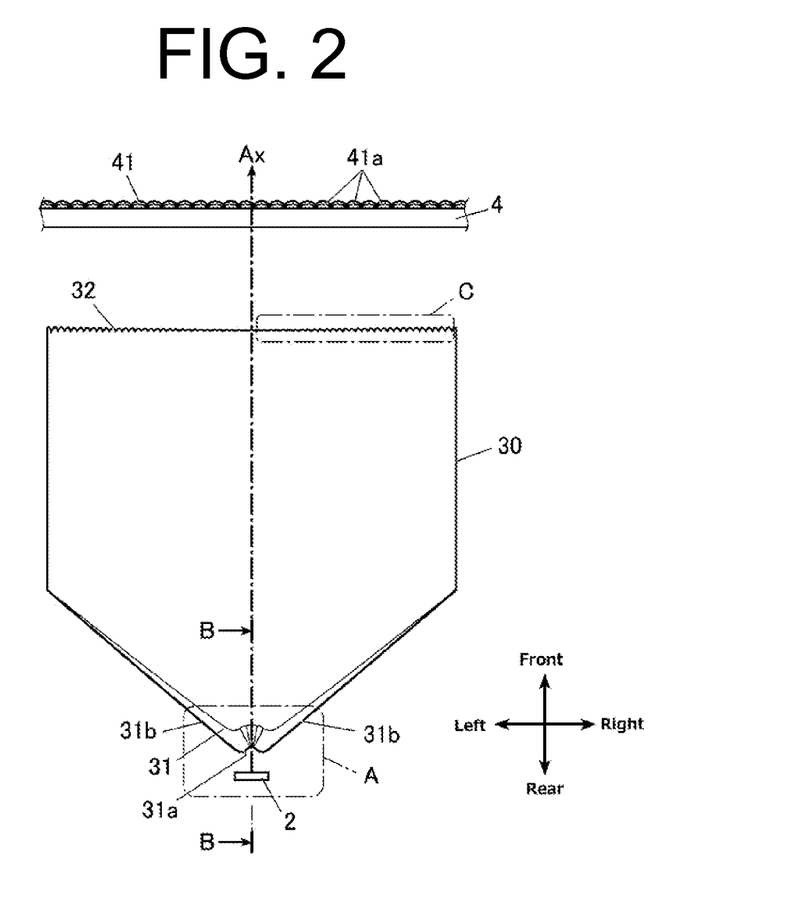
FIG. 2 is a plan view of parts corresponding to each LED in the vehicle lighting unit according to the present exemplary embodiment.
Figure 3A:
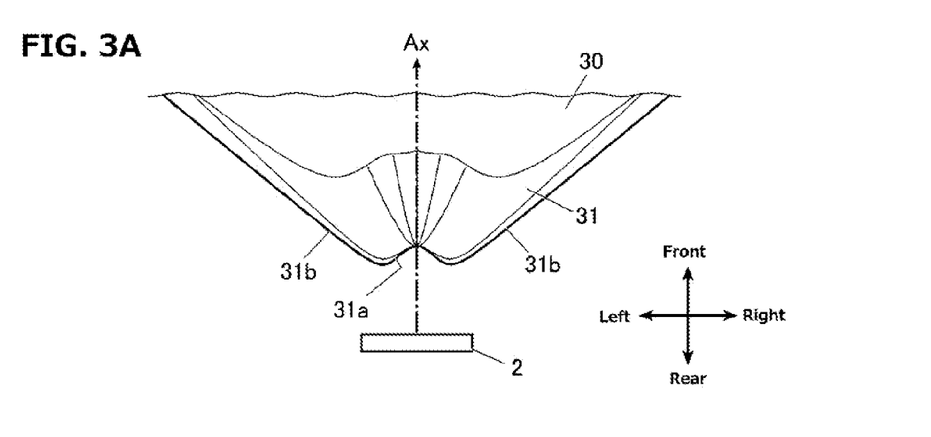
FIGS. 3A, 3B, and 3C are an enlarged view of part A in FIG. 2; a cross-sectional view taken along line B-B in FIG. 2; and an enlarged view of part C in FIG. 2, respectively.
Figure 3B:
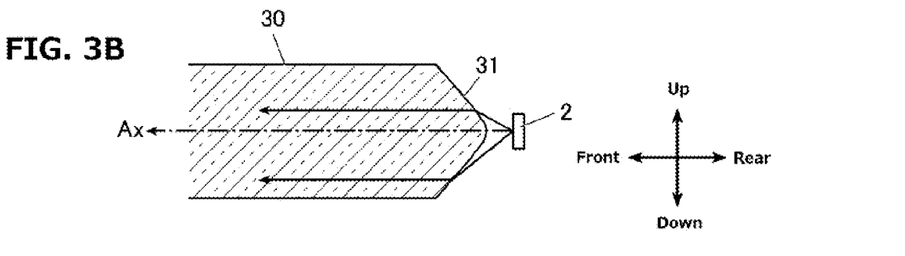
Figure 3C:
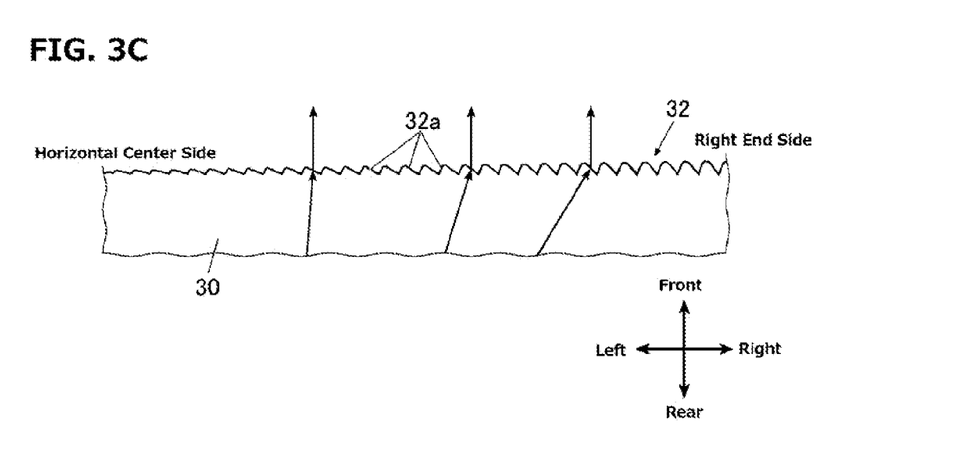
Figure 4A:
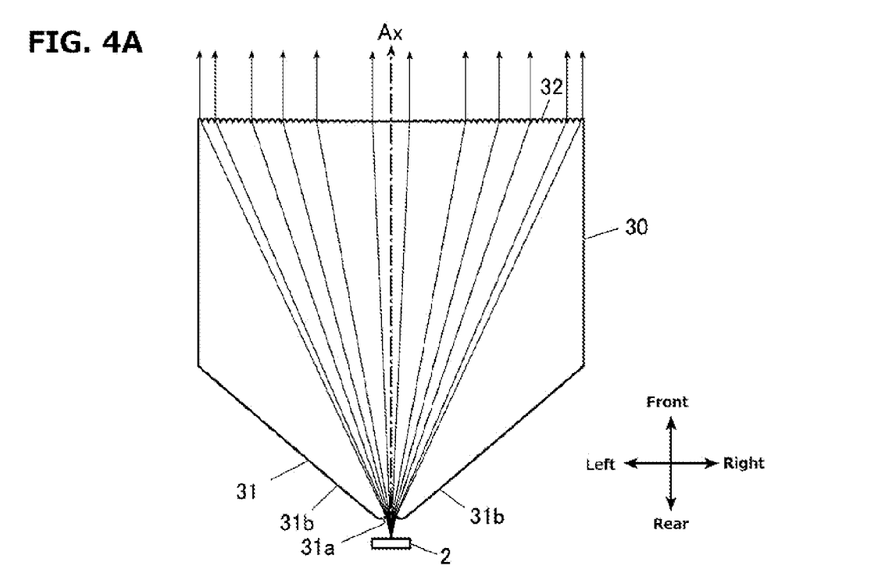
FIGS. 4A and 4B are each a schematic flat view illustrating the manner in which the light rays are refracted at a light incident face of the light guiding lens of the present exemplary embodiment.
Figure 4B:
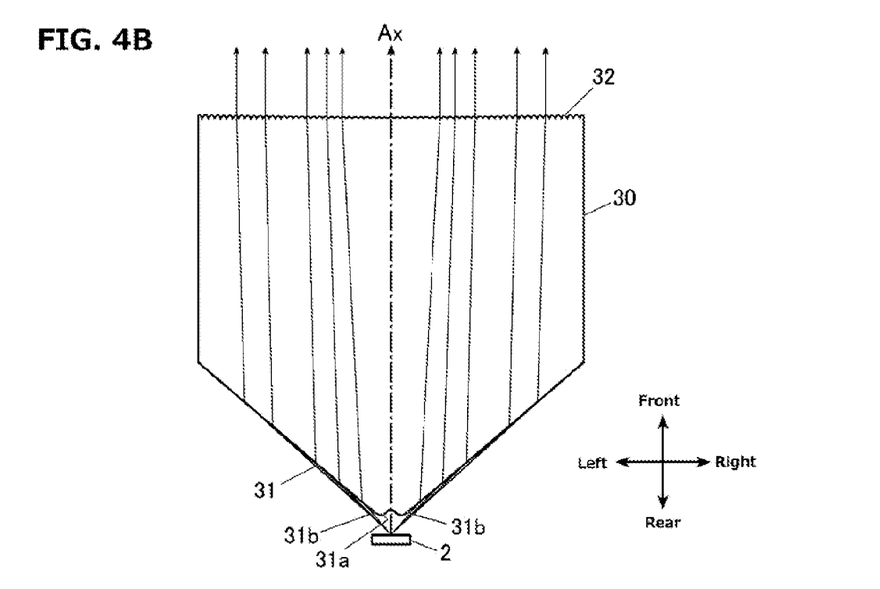

FIG. 1 is a perspective view of essential parts of a vehicle lighting unit 1 made in accordance with principles of the presently disclosed subject matter. FIG. 2 is a plan view of parts corresponding to each LED in the vehicle lighting unit 1. FIGS. 3A, 3B, and 3C are an enlarged view of part A in FIG. 2; a cross-sectional view taken along line B-B in FIG. 2; and an enlarged view of part C in FIG. 2, respectively. Furthermore, FIGS. 4A and 4B are each a schematic flat view illustrating the manner in which the light rays are refracted at a light incident face 31 of a light guiding lens 30.

Note that the directions used herein are defined so that the direction in which light rays travel is the front side (forward direction), and the flat plate shape of the light guiding lens 30 is spread in the horizontal direction (including left-right direction and front-rear direction) and its thickness direction is the vertical direction perpendicular to the horizontal direction.

As illustrated in FIGS. 1 and 2, the vehicle lighting unit 1 can include a plurality of light emitting diodes (LEDs) 2 (in the present exemplary embodiment, three LEDs), and a light guiding lens unit 3 corresponding to the plurality of LEDs 2, and a diffusion lens 4.

Each of the LEDs 2 can be disposed such that an optical axis Ax thereof is directed forward substantially in a front-rear direction. Then, the three LEDs 2 can be arranged side by side at equal intervals along in a left-right direction. Each of the LEDs 2 can emit light rays forward and substantially radially around the optical axis Ax. Incidentally, each of the LEDs 2 can have a directivity of light rays in which the intensity of light rays is lowered as the emission angle is larger with respect to the optical axis Ax.

The light guiding lens unit 3 can control light rays emitted from the respective LEDs 2 and be disposed in front of the LEDs 2. The light guiding lens unit 3 can include a plurality of light guiding lenses 30 (three in the present exemplary embodiment) disposed in front of the corresponding LEDs 2 and side by side. Specifically, light exiting faces 32 of the light guiding lenses 30 can be configured to be continued to each other in the left-right direction.

Each of the light guiding lenses 30 can have a flat plate shape or a home base shape in a plane view having a steeple on the rear side and a substantially constant thickness. The extending direction in which the plate shape extends can be perpendicular to the vertical direction. More specifically, each of the light guiding lenses 30 can be disposed such that the optical axis Ax of the LED 2 passes through the vertical and horizontal (left-right) center of each of the light guiding lenses 30. Further, the shape of the light guiding lenses 30 can be designed to be symmetric in the vertical direction as well as in the left-right direction.

Each of the light guiding lenses 30 can include a light incident face 31 at its steeple on the rear side to receive the light rays from the LED 2, and a light exiting face 32 on the front side, perpendicular to the front-to-rear direction, so that the light rays entering through the light incident face 31 is guided through the light guiding lens 30 to exit through the light exiting face 32 forward.

Specifically, the light incident face 31 can receive the light rays from the LED 2 to uniformly spread the light rays in the left-right direction along the horizontal cross section (cross section substantially taken along the horizontal direction) while making the light rays parallel to one another along the vertical cross section (cross section substantially taken along the vertical direction perpendicular to the horizontal direction). Thereby, the light rays can enter the light guiding lens 30.

As can be understood from FIG. 3A (which shows a plan view), the horizontal cross section of the light incident face 31 is formed as follows. Specifically, the light incident face 31 can include a center recessed portion 31a opened rearward and two projected portions 31b disposed on both sides of the recessed portion 31a. The projected portion 31b can extend from the recessed portion 31a and be projected rearward, and then curved obliquely forward and sideward, thereby forming a smoothly continued two-humped shape.

Two connection points (or the apexes of the two-humped structure) between the recessed portion 31a and two projected portions 31b can be designed such that they are separated away from each other in the left-right direction as the points move from the horizontal plane passing through the optical axis Ax (vertical center) toward both sides in the vertical direction. The two connection points are preferably positioned on the horizontal plane at the vertical center passing through the optical axis Ax such that the emission angles of the light rays as seen from the LED 2 side are 1/2 to 3/2 times the half-value angle, and in the present exemplary embodiment, the two connection points can be positioned such that the emission angles substantially become the half-value angle.

As shown in the horizontal cross-sectional shape of the light incident face 31, the center recessed portion 31a can be designed such that the light rays emitted from the LED 2 can enter the light guiding lens 30 while the light rays with relatively high intensity around the optical axis Ax are diffused (refracted) horizontally (in the left-right direction) to be spread over the entire light exiting face 32.

On the other hand, as illustrated in FIG. 4B, the two projected portions 31b can be configured such that the light rays emitted from the LED 2 directed sideward more than those toward the recessed portion 31a, having relatively low intensity, can enter the light guiding lens 30 therethrough while the light rays can be gathered (refracted) along the front-rear direction toward the light exiting face 32.

The vertical cross section of the light incident face 31 can be formed to be projected rearward with the portion at the vertical center (vertical direction with respect to the optical axis Ax) being an apex. This light incident face 31 with the vertical cross section can receive the light rays emitted from the LED 2 while the light rays are made substantially parallel to the optical axis Ax, whereby the light rays are allowed to enter the light guiding lens 30.

The light exiting face 32 as illustrated in FIG. 2 can be an elongated surface disposed in front of the light incident face 31 and extending in the left-right direction. The light rays entering through the light incident face 31 and guided by the light guiding lens 30 can be further refracted to exit therethrough as parallel light rays substantially to the optical axis Ax (front-rear direction).

Specifically, as illustrated in FIG. 3C, the light exiting face 32 can have a plurality of prism cuts 32a formed on the entire surface of a standard face and disposed side by side in the left-right direction. Here, the standard face can be defined as a flat face perpendicular to the front-rear direction and extending in the left-right direction. The plurality of prism cuts 32a can be configured to make the light rays from the light incident face 31, mainly from the recessed portion 31a (as illustrated in FIG. 4A), parallel to one another. Since the light rays entering through the recessed portion 31a of the light incident face 31 at a position away more from the optical axis Ax in the left-right direction can be incident on the light exiting face 32 with a larger incident angle, the plurality of prism cuts 32a can each have a plane inclined with a larger angle at a position away more from the optical axis Ax in the left-right direction as illustrated in FIG. 3C.

The diffusion lens 4 can be formed in an elongated plate shape extending in the left-right direction so as to cover the light guiding lens unit 3 from its front side, as illustrated in FIGS. 1 and 2. Part of the front face of the diffusion lens 4 substantially covering the entire light exiting faces 32 of the light guiding lens unit 3 can serve as a diffusion face 41 configured to diffuse light rays from the light guiding lens unit 3 in the vertical and horizontal directions. In order to do so, the diffusion face 41 of the diffusion lens 4 can include a plurality of diffusion lens cuts 41a formed on the entire surface thereof. In the present exemplary embodiment, the diffusion face 41 can include a plurality of projected fish-eye lens cuts arranged in a matrix shape.

With this configuration, the diffusion lens 4 can diffuse the parallel light rays projected forward through the light guiding lens unit 3 (the plurality of light guiding lenses 30), in the vertical and horizontal directions by means of the plurality of diffusion lens cuts 41a of the diffusion face 41. This configuration can achieve the uniform illumination of the diffusion face 41 of the horizontally elongated diffusion lens 4.

As described above, in the vehicle lighting unit 1 according to the present exemplary embodiment, when the light rays emitted from the LED 2 are incident on the light incident face 31 to enter the light guiding lens 30, the light rays incident on the center recessed portion 31a of the light incident face 31 around the optical axis Ax can be diffused by the center recessed portion 31a around the optical axis Ax in the left-right direction of the light exiting face in the cross section taken along the plane along the longitudinal direction (left-right direction) of the light exiting face 32 while the light rays incident on the two convex portions 31b disposed on both sides of the center recessed portion 31a can be condensed forward substantially along the front-rear direction. Furthermore, the light rays from the LED 2 when seen in the vertical cross section taken along the plane perpendicular to the left-right direction of the light exiting face 32 can be made parallel to one another substantially along the front-rear direction.

Accordingly, the light rays emitted from the LED 2 and having relatively high intensity around the optical axis Ax can be diffused in the left-right direction of the light incident face 31 while the light rays having low intensity sideward with respect to the optical axis Ax can be directed to both sides rather than forward of the LED 2.

Therefore, the vehicle lighting unit 1 can achieve line-shaped (straight lined) light emission with reduced luminance unevenness more than the conventional ones in which portions of the light emission portion just in front of the LED project high intensity of light.

The light exiting face 32 of the light guiding lens 30 can include the plurality of prism cuts 32a. The prism cuts 32a can be configured to make the light rays guided from the light incident face 31 parallel substantially along the front-rear direction. Therefore, the light exiting face 32 of the light guiding lens 30 can project the parallel light rays exiting therethrough with a uniform distribution.

Furthermore, the diffusion lens 4 can be disposed in front of the light guiding lens(es) 30 in order to diffuse the light rays exiting from the light guiding lens(es) 30 while allowing the light rays to pass therethrough forward. Since the parallel light rays exiting through the light exiting face 32 with the uniform distribution can be diffused by the diffusion lens 4, the vehicle lighting unit can achieve more uniform illumination of the front face (diffusion face 41) of the diffusion lens 4.

The above exemplary embodiment has dealt with a case where a plate-shaped light guiding lens 30 is used to achieve linear light emission. In a variation illustrated in FIG. 5 (a front view of a variation of the light guiding lens), a curved plate-shaped light guiding lens 30A having a curved light exiting face 32A can be utilized to achieve curved linear light emission.

Figure 5:
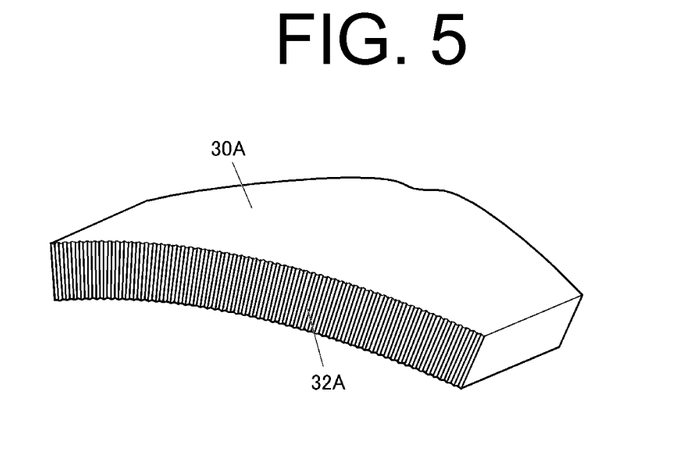
FIG. 5 is a front perspective view of a variation of the light guiding lens in the present exemplary embodiment.

Specifically, the light guiding lens 30A can be configured to make the light guiding lens 30 of the above exemplary embodiment curved in the vertical direction (or in the thickness direction), so that the light rays emitted from the corresponding LED 2 can be projected forward through the entire surface of the curved light exiting face 32A.

Figure 6:
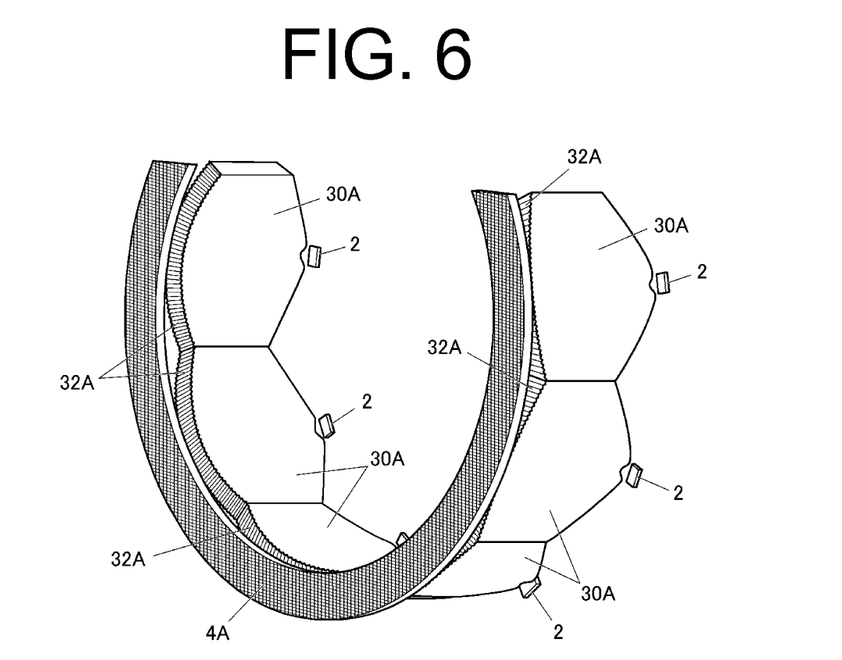
FIG. 6 is a perspective view illustrating a variation of a vehicle lighting unit using the light guiding lens of FIG. 5.

FIG. 6 is a perspective view illustrating a variation of a vehicle lighting unit using the light guiding lenses 30A of FIG. 5. Specifically, a plurality of the light guiding lenses 30A can be arranged to be continued in the lengthwise direction to form a circular arc emission shape as a whole. They can be used in combination with a circular arc shaped diffusion lens 4A disposed in front of the light guiding lenses 30A. With this configuration, the circular arc front face of the diffusion lens 4A can be uniformly illuminated with light from the light guiding lenses 30A.

By adjusting the radius of curvature of each arc shape of the light guiding lens 30A and the manner of connection between them, light emission in the shape of a perfect circle, an oval, etc. can be achieved.

Figure 7:
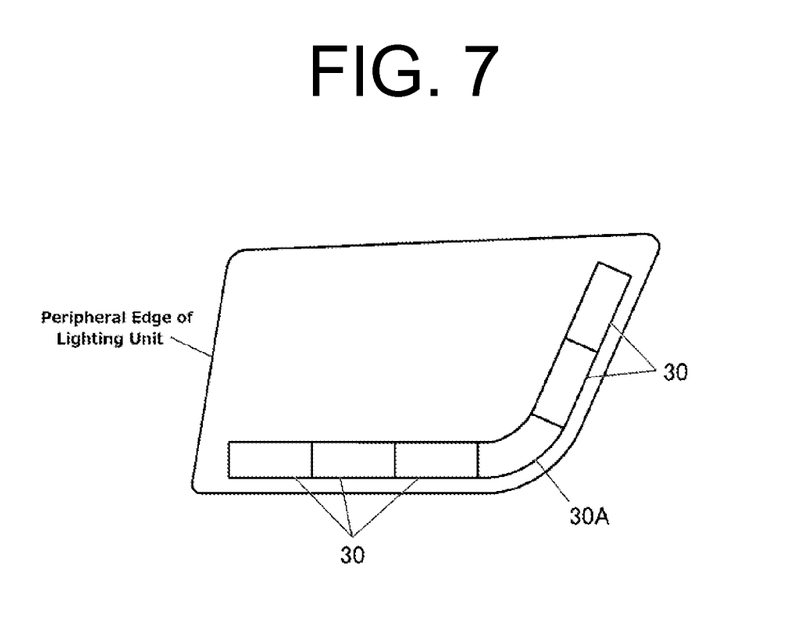
FIG. 7 is a perspective view illustrating another variation of a vehicle lighting unit in the present exemplary embodiment.

The plate-shaped light guiding lens 30 and the curved plate-shaped light guiding lens 30A can be combined. FIG. 7 is a perspective view illustrating another variation of a vehicle lighting unit in the present exemplary embodiment, wherein a plurality of plate-shaped light guiding lenses 30 and a curved light guiding lens 30A are used along a peripheral edge of a lighting unit. This configuration can achieve a line-shaped emission portion along a lighting unit even having a complex curved shape.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting unit comprising:
an LED having an optical axis in an illumination direction thereof as a forward direction; and
a light guiding lens having a plate shape and disposed in front of the LED, wherein
the LED has a directivity of light rays in which an intensity of light rays is lowered as an emission angle is larger with respect to the optical axis,
the light guiding lens includes
a light incident face formed at a rear end thereof, and
a light exiting face formed at a front end thereof and having an elongated face extending along a plane substantially perpendicular to a front-rear direction,
the light incident face has a cross section taken along a plane along a longitudinal direction of the light exiting face, the cross section including a center recessed portion configured to receive light rays emitted from the LED around the optical axis thereof to diffuse the light rays toward the light exiting face in the elongated direction, and two convex portions disposed on both sides of the recessed portion, configured to receive light rays emitted from the LED sideward more than those directed to the recessed portion to condense the light rays forward substantially along the front-rear direction, and
the light incident face further has a cross section taken along a plane perpendicular to the longitudinal direction of the light exiting face, the cross section including a convex face configured to receive the light rays from the LED to make the light rays parallel to one another substantially along the front-rear direction,
the cross section of the two convex portions disposed on both sides of the recessed portion along the longitudinal direction of the light exiting face has a shape extending from the center recessed portion, projecting rearward, and then being curved obliquely forward and sideward to form a smoothly continued two-humped shape,
two connection points between the recessed portion and the two convex portions in the cross section along the longitudinal direction of the light exiting face are positioned in such a direction that emission angles of the light rays as seen from the LED are 1/2 to 3/2 times a half-value angle,
the light exiting face has a cross section taken along the longitudinal direction of the light exiting face with both ends corresponding to both right and left ends of the cross section of the light incident face,
the recessed portion is configured such that in the cross section along the longitudinal direction of the light exiting face the light rays emitted from the LED and entering the light guiding lens through the recessed portion are diffused to be spread over the entire light exiting face in the longitudinal direction thereof, and
the two convex portions are configured such that in the cross section along the longitudinal direction of the light exiting face the light rays emitted from the LED and entering the light guiding lens through the two convex portions are gathered along the front-rear direction.

2. The vehicle lighting unit according to claim 1, wherein the light exiting face includes a plurality of prism cuts formed thereon, the prism cuts being configured to make the light rays guided from the light incident face parallel substantially along the front-rear direction.

3. The vehicle lighting unit according to claim 1, further comprising a diffusion lens disposed in front of the light guiding lens, the diffusion lens being configured to diffuse the light rays exiting from the light guiding lens while allowing the light rays to pass therethrough forward.

4. The vehicle lighting unit according to claim 2, further comprising a diffusion lens disposed in front of the light guiding lens, the diffusion lens being configured to diffuse the light rays exiting from the light guiding lens while allowing the light rays to pass therethrough forward.

5. A composite vehicle lighting unit, comprising at least two vehicle lighting units according to claim 1, wherein the light exiting faces of the light guiding lenses of the vehicle lighting units are disposed to be continued to each other along the lengthwise direction of the light exiting face.

6. The vehicle lighting unit according to claim 5, wherein the light exiting face includes a plurality of prism cuts formed thereon, the prism cuts being configured to make the light rays guided from the light incident face parallel substantially along the front-rear direction.

7. The vehicle lighting unit according to claim 5, further comprising a diffusion lens disposed in front of the light guiding lens, the diffusion lens being configured to diffuse the light rays exiting from the light guiding lens while allowing the light rays to pass therethrough forward.

8. The vehicle lighting unit according to claim 6, further comprising a diffusion lens disposed in front of the light guiding lens, the diffusion lens being configured to diffuse the light rays exiting from the light guiding lens while allowing the light rays to pass therethrough forward.

9. The vehicle lighting unit according to claim 5, wherein at least one of the light guiding lenses is curved in a thickness direction thereof.

10. The vehicle lighting unit according to claim 6, wherein at least one of the light guiding lenses is curved in a thickness direction thereof.

11. The vehicle lighting unit according to claim 7, wherein at least one of the light guiding lenses is curved in a thickness direction thereof.

12. The vehicle lighting unit according to claim 8, wherein at least one of the light guiding lenses is curved in a thickness direction thereof.

13. A vehicle lighting unit comprising:
an LED having an optical axis in an illumination direction thereof as a forward direction; and
a light guiding lens having a plate shape and disposed in front of the LED, the light guiding lens being symmetric relative to the optical axis in a left-right direction and projected rearward to have a home base shape, wherein
the LED has a directivity of light rays in which an intensity of light rays is lowered as an emission angle is larger with respect to the optical axis
the light guiding lens includes
a light incident face formed at a rear end thereof, and
a light exiting face formed at a front end thereof and having an elongated face extending along a plane substantially perpendicular to a front-rear direction,
the light incident face has a cross section taken along a plane along a longitudinal direction of the light exiting face, the cross section including a center recessed portion configured to receive light rays emitted from the LED around the optical axis thereof to diffuse the light rays toward the entire light exiting face in the elongated direction, and two right and left convex portions disposed on respective sides of the recessed portion, the right and left convex portions being configured to receive light rays emitted from the LED rightward and leftward to gather the light rays forward substantially along the front-rear direction to cause the light rays to exit through corresponding right and left faces of the light exiting face relative to the optical axis, respectively, and
the light incident face further has a cross section taken along a plane perpendicular to the longitudinal direction of the light exiting face, the cross section including a convex face configured to receive the light rays from the LED to make the light rays parallel to one another substantially along the front-rear direction.

14. The vehicle lighting unit according to claim 13, wherein the light exiting face includes a plurality of prism cuts formed thereon, the prism cuts configured to make the light rays guided from the light incident face parallel substantially along the front-rear direction.

15. The vehicle lighting unit according to claim 13, wherein the light guiding lens is curved in a thickness direction thereof.

16. The vehicle lighting unit according to claim 14, wherein the light guiding lens is curved in a thickness direction thereof.

* * * * *